United States Patent [19]

Yeames

[11] Patent Number: 4,688,702
[45] Date of Patent: Aug. 25, 1987

[54] SELF CLEANING MIXER AND DISPENSER OF FLUID MATERIALS

[76] Inventor: James Yeames, 1 Butler St., Newburyport, Mass. 01950

[21] Appl. No.: 811,431

[22] Filed: Dec. 20, 1985

[51] Int. Cl.$^4$ .............................................. B67D 1/08
[52] U.S. Cl. .................................... 222/145; 222/135; 222/149; 366/187
[58] Field of Search ...................... 366/138, 187, 220; 222/129, 135–136, 144–145, , 148–149, 322, 390, 501, 522–523, 167, 389, 333–334

[56] References Cited

U.S. PATENT DOCUMENTS

| | | | |
|---|---|---|---|
| 2,722,357 | 11/1955 | Whitecar | 366/187 X |
| 3,353,537 | 11/1967 | Knox et al. | 222/334 X |
| 4,252,255 | 2/1981 | Henderson | 222/135 |
| 4,452,917 | 6/1984 | Proksa et al. | 222/149 X |
| 4,467,943 | 8/1984 | Carse | 222/309 |
| 4,471,887 | 9/1984 | Decker | 222/135 |
| 4,523,696 | 6/1985 | Commette et al. | 222/135 |

FOREIGN PATENT DOCUMENTS 1556297  11/1967  France ................................. 222/389

Primary Examiner—Joseph J. Rolla
Assistant Examiner—Michael S. Huppert
Attorney, Agent, or Firm—Robert T. Dunn

[57] ABSTRACT

A dispenser for mixing fluid materials and dispensing the mixture includes a common passage having an output or dispensing nozzle end and an input end into which the separate fluid materials are injected from separate passages, the common passage being essentially straight and of constant cross section shape and size from end to end, a clean out plunger projecting into the input end of the common passage closing that end when the plunger is at its withdrawn position, a drive for the plunger for driving it through the common passage from the input end to the output end, forcing any material in the common passage out of the dispensing nozzle, so that the common passage is cleaned out and drive for withdrawing the plunger through the common passage back to its withdrawn position so that the materials can again be injected into the common passage and dispensed from the nozzle.

13 Claims, 18 Drawing Figures

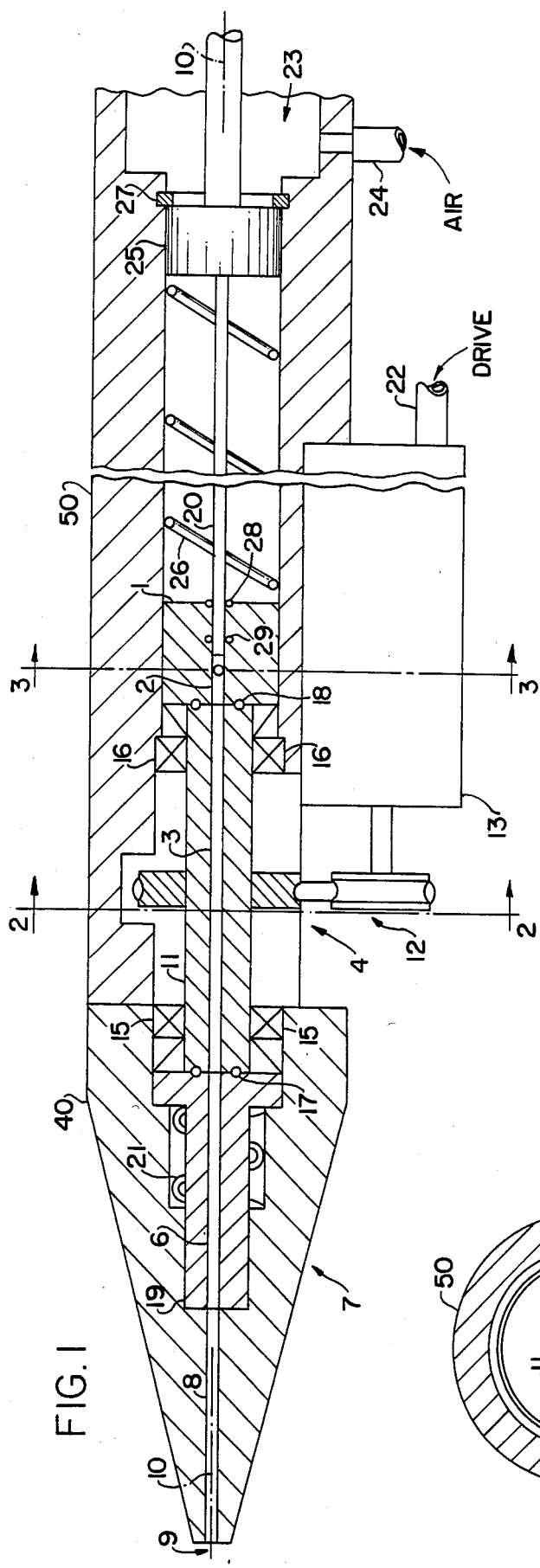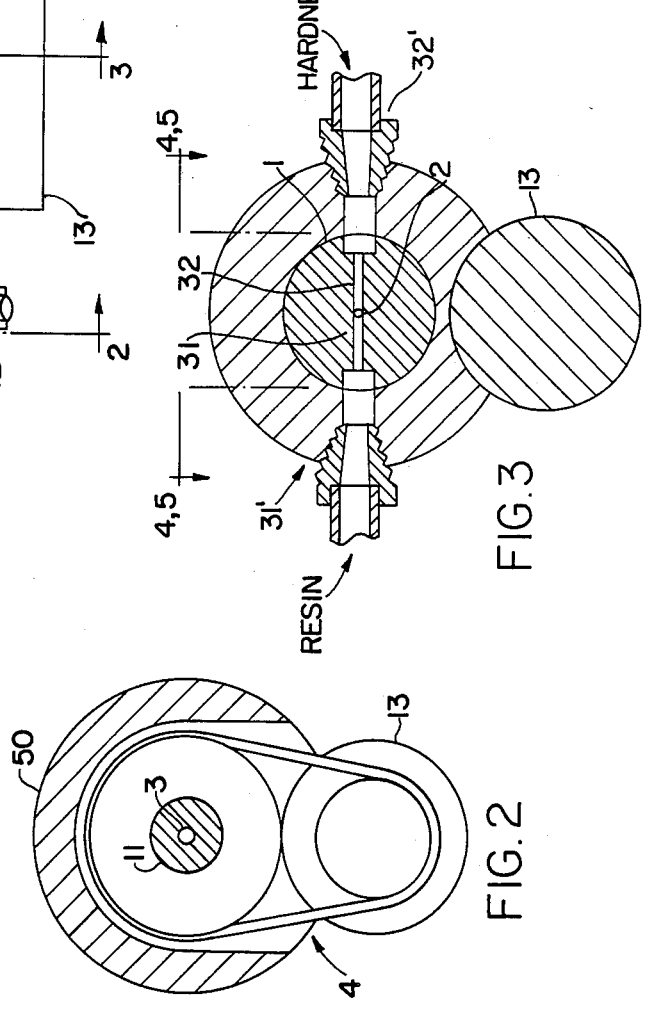

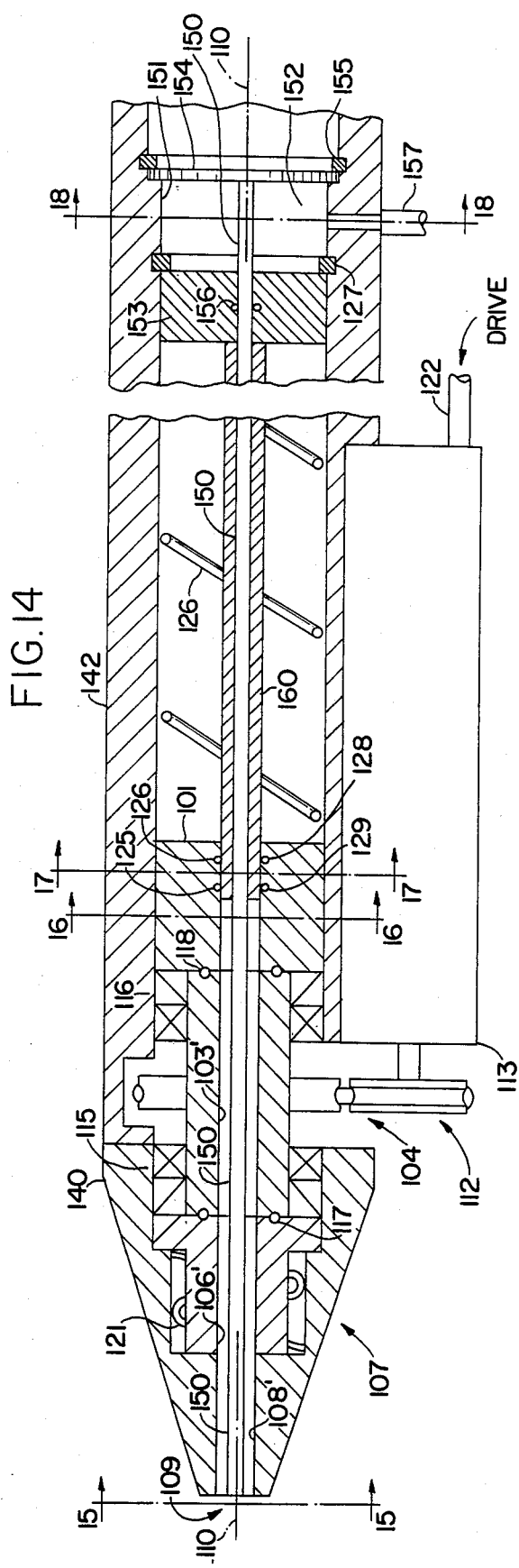

SELF CLEANING MIXER AND DISPENSER OF FLUID MATERIALS

BACKGROUND OF THE INVENTION

The present invention relates to devices for mixing and dispensing fluid materials and more particularly to hand held dispensers of the sort that are self cleaning so that when the fluid materials harden in the dispensing passage of the device, those passages can be cleaned of the hardened material.

Herefore, pressurized dispensing containers have been used for dispensing a mix of two or more fluid substances through a single nozzle. They include a chamber for mixing the fluids before they flow from the nozzle. Such dispensers are used for dispensing materials that cannot be pre-mixed and stored in the container, but must be mixed only as they are dispensed. Compositions such as glue, epoxy, polyurethan foam, paint, lacquer, insecticide, cosmetics, and even creamy whipped foods and the like require two different material to be separated in the dispenser and mixed together only at the time of use. For such dispensers and particularly for those that dispense glue, adhesive, or epoxy, the mixing chamber and the dispensing channels and orifices from the mixing chamber to the output must be cleaned out immediately after dispensing, or the mixed material will harden therein (or spoil) and make the dispenser useless.

Glue that sets by drying in air is often stored in liquid form under pressure and dispensed from a nozzle. The liquid glue flows from a container under pressure through a passage to the dispensing nozzle and the flow is controlled by a valve in the passage and/or by controlling the pressure. After dispensing, a crust of hardened glue forms at the nozzle where it is exposed to air. Most often, the crust is easily broken by the liquid glue behind it and so no extra step to clear the nozzle must be taken. On the other hand, some epoxy glue is a mix in predetermined proportions of liquid resin and hardner. Although neither the resin or the hardener alone will harden, they must be thoroughly mixed before dispensed and once mixed will harden even though not exposed to air and so the mixing passages and chambers and the dispensing nozzle must all be cleaned out thoroughly after each use. So also, reactive acrylic and urethane adhesives and coatings are mixtures of a resin and a catalyst that must be mixed thoroughly before dispensing and requires that the mixing chamber be cleared after each use.

Heretofor, liquid solvent has been used to flush out the passages and chambers to clear them of the mixed epoxy and so avoid blocking. That, of course, requires a ready supply of the solvent and means for feeding it into the dispenser passages and chambers Furthermore, cleaning out the passages and chambers in this way wastes solvent and requires a disposal for the wasted solvent.

It is an object to provide a dispenser of fluid material wherein the above described problems are avoided, diminished or compensated for.

It is another object of the present invention to provide a fluid material dispenser for a mixture of two or more different fluids that are mixed therein, incorporating means for cleaning out mixing and dispensing passages.

It is another object of the present invention to provide a method and means of mixing two different fluid materials and then cleaning out all parts thereof through which the mixed materials flow and closing off the material injection passages to those parts except when the apparatus is dispensing the mixture.

It is a further object to provide such a dispenser including a mixing chamber into which the two materials are fed and means for driving the mixing chamber in rotation to enhance mixing.

SUMMARY OF THE INVENTION

In all embodiments of the present invention, a dispenser for mixing separated fluid materials like the resin and the hardener of an epoxy glue and dispensing the epoxy mixture includes a common passage into which the resin and hardener are injected from separate injection passages. The common passage is essentially straight and of constant cross section shape and size from the input end of the common passage where the resin and hardener are injected to a dispensing nozzle at the output end thereof. Mixing takes place in the common passage. After dispensing the epoxy mixture, the common passage is cleaned out by a clean out plunger. The cleaning stroke of the plunger begins from its initial or withdrawn position at the input end of the common passage where it closes the passage beyond the point of injection of the resin and hardener into the common passage. In the cleaning stroke, the plunger is driven through the common passage to the nozzle, forcing any epoxy in the common passage out of the nozzle. Then the plunger is withdrawn to its initial position and the device is ready again to dispense epoxy. Particular embodiments are described that provide cylindrical and annular dispensing passages.

In a preferred embodiment of the present invention, a section of the common passage is rotatable on its longitudinal axis and a drive motor is provided for driving said section in rotation on its axis when the mixture of resin and hardener flow through it, and so the resin and hardener are thoroughly mixed in the rotated section. Mixing is caused when the two materials flow through the rotated mixing section by friction forces between the fluid and the walls of the section.

Then, during the cleaning stroke, the clean out plunger cleanes out the common passage to the mixing section, the mixing section and the passage from the mixing section to the nozzle, in that order.

The embodiments of the present invention described herein represent the best known uses of the invention and are described with reference to the accompanying figures in which:

DESCRIPTION OF THE DRAWINGS

FIG. 1 is a side cross section view taken along the longitudinal axis of a self cleaning mixer and dispenser according to the present invention in which the common passage is cylindrical and uniform cross section;

FIG. 2 is a cross section view of the dispenser taken perpendicular to the longitudinal axis at a point therealong shown in FIG. 1 and shows the mixer drive;

FIG. 3 is a cross section view taken perpendicular to the axis as indicated in FIG. 1 and shows the separate passages for injecting resin and hardener into the common passage that leads to the mixing section;

FIGS. 4 and 5 are top cross section views taken along the axis of the dispenser as shown in FIG. 3, showing opposing and staggered arrangements, respectively, of the resin and hardner injection passages into the common passage within the dispenser valves;

3

Figure 6:
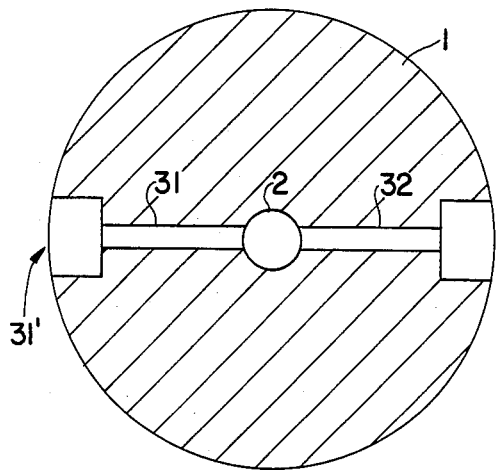
Figure 7:
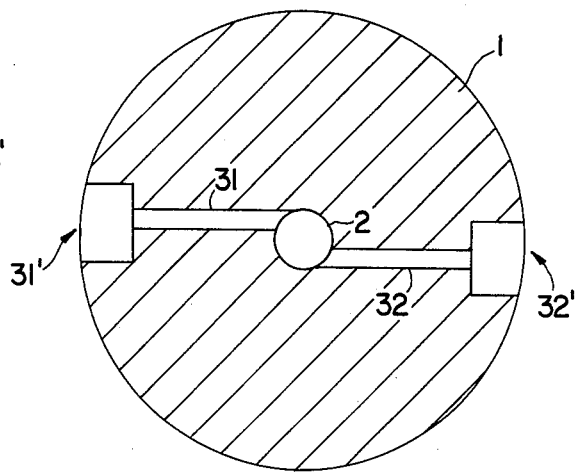
Figure 8:
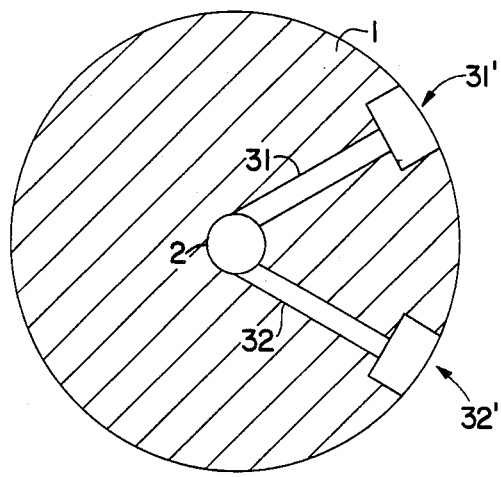
Figure 9:
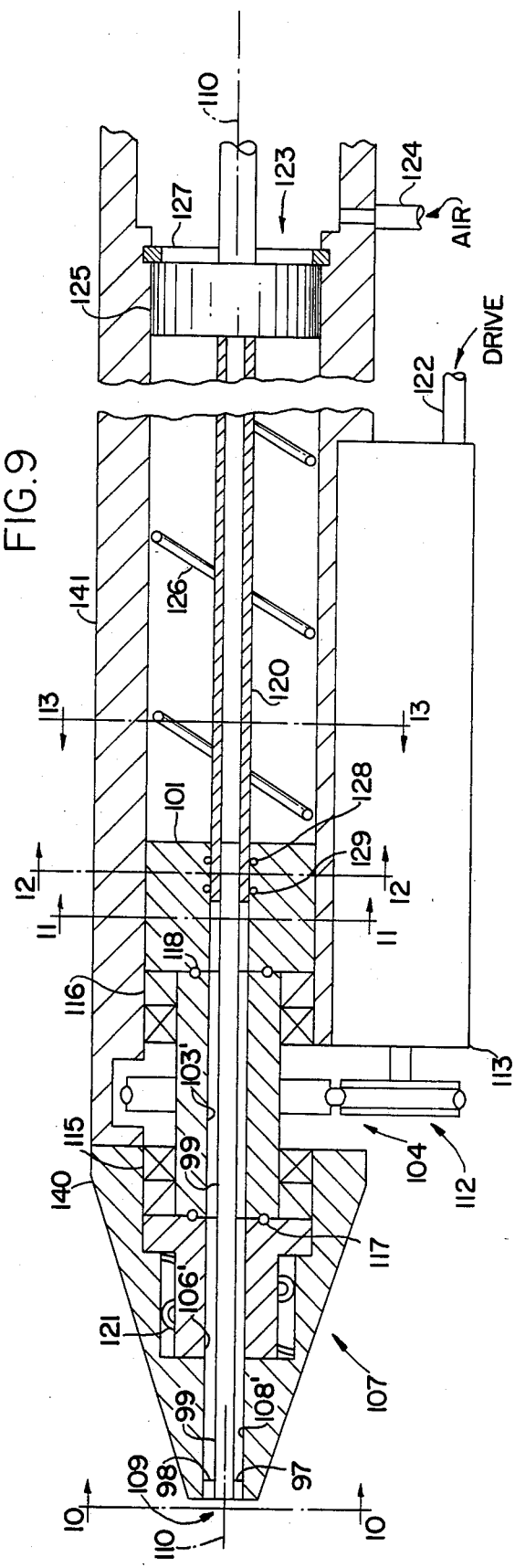
Figure 13:
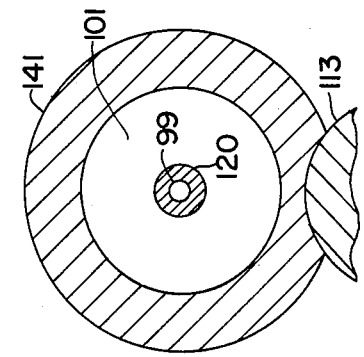
Figure 12:
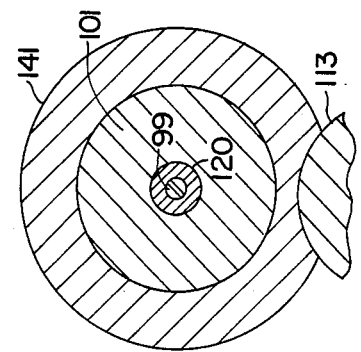
Figure 11:
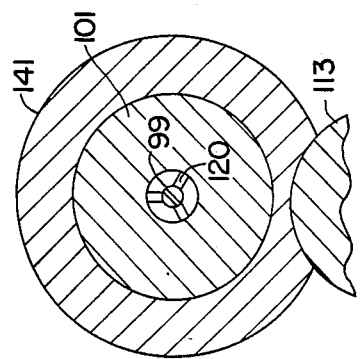
Figure 10:
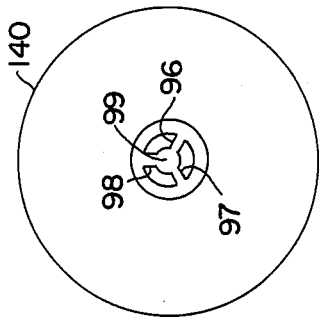

FIGS. 6, 7 and 8 are enlarged cross section views taken perpendicular to the axis of three arrangements of the resin and hardner injection passages into the dispensing valve;

FIG. 9 is a side cross section view taken along the longitudinal axis of another embodiment of self cleaning mixer and dispenser according to the present invention in which the common passage is annular, uniform cross section and defined by a fixed center body rod within a cylindrical passage, the clean out plunger is annular to fit the annular passage and the center body is secured to the housing at the front of the nozzle;

FIG. 10 is a cross section view of the dispenser of FIG. 9 taken perpendicular to the axis where indicated in FIG. 9 and shows the dispensing nozzle;

FIG. 11 is a cross section view of the dispenser taken perpendicular to the axis as indicated in FIG. 9 and shows the foreward face of the annular plunger with projections that fit the nozzle openings to clean them out;

FIG. 12 is a cross section view of the dispenser taken perpendicular to the axis as indicated in FIG. 9 and shows the annular plunger filling the annular common passage around the center rod; and FIG. 13 is a cross section view of the dispenser taken perpendicular to the axis as indicated in FIG. 9 and shows the extension of the clean out plunger to its drive piston.

FIG. 14 is a side cross section view taken along the longitudinal axis of another embodiment in which the common passage is annular, uniform cross section and defined by a fixed center body rod within a cylindrical passage, the clean out plunger is annular to fit the annular passage and the center body passes through the annular plunger and its drive piston and is secured to the housing on the pressure side of the drive piston;

FIG. 15 is a cross section view of the dispenser of FIG. 14 taken perpendicular to the axis where indicated in FIG. 14 and shows the dispensing nozzle;

FIG. 16 is a cross section view of the dispenser taken perpendicular to the axis as indicated in FIG. 14 and shows the foreward face of the annular plunger;

FIG. 17 is a cross section view of the dispenser taken perpendicular to the axis as indicated in FIG. 14 and shows the annular plunger filling the annular common passage around the center body rod; and FIG. 18 is a cross section view of the dispenser taken perpendicular to the axis as indicated in FIG. 14 and shows the center body rod where it emerges from the plunger piston on the pressure side thereof and attaches to the housing.

DESCRIPTION OF EMBODIMENTS OF THE INVENTION

Mixer/Dispenser With Cylindrical Output Passage

As shown in FIGS. 1 to 4, the stationery valve 1 into which two different materials, a resin and a hardner flow, provides a cylindrical passage 2 that feeds directly into a mixing passage 3 coaxial therewith and the same diameter, that is part of the mixing assembly 4. The mixing passage 3 feeds directly into the dispensing passage 6 which is part of the dispensing assembly 7 and is coaxial with and the same diameter as the mixing passage. From passage 6, the mixture of resin and hardner (the epoxy mix) flows to passage 8 of housing 40 and emerge from the dispensing orifice 9 at the end of passage 8. Thus, the passages 2, 3, 6, 8 and orifice 9 all align and all are the same diameter so that the clean out plunger 20 can pass through all of these passages and out of orifice 9 to clean out the passages. Plunger 20 shown in its withdrawn or retracted position in FIGS. 1 to 5, just enters passage 2 up to the side injection passages 31 and 32 that led into passage 2 from separate containers for the resin and hardner, respectively.

Injection passage 31 for the resin and 32 for the hardner may be directly opposite each other on opposite sides of passage as shown in FIG. 4, or they may be staggered along passage 2 as shown in FIG. 5. Other arrangements of the resin and hardner injection passages, as viewed along the longitudinal axis 10, are illustrated by FIGS. 6, 7 and 8. They may feed fluid into passage 2 tangentially as shown in FIG. 7 in any of the arrangements shown in FIGS. 6, 7 and 8. The common feature of all these feeds in accordance with the present invention is that the injection passage for each material into passage 2 is closed off by plunger 20 when it moves from its retracted position shown in FIG. 1, forward and into the passages 2, 3, 6 and 8.

In operation, with the plunger in the retracted or withdrawn position shown in FIG. 1, the liquid resin and hardner are injected into passage 2 through the injection passages 31 and 32 and both flow immediately into passage 3 of mixer 4. Meanwhile, the mixing cylinder 11 that contains passage 3 is driven in rotation at high speed about axis 10 by a drive train 12 from air motor 13. For this purpose, the mixing cylinder 11 is mounted on bearings 15 and 16 within the housing 40 of the dispenser and the mixer and injection housing 50. The ends of cylinder 11 include seals at 17 and 18 that prevent fluid material from leaking out of the passages. The spinning action imparted to passage 3 and to the liquid contained therein thoroughly mixes the liquid resin and hardner so that they emerge from passage 3 and flow into passage 6 of the lower seal guard 19 thoroughly mixed and this mix flows through the dispensing nozzle passage 8 and out orifice 9.

The lower seal guard 19 slideably fits within the front end of housing 40 and spring 21 acts between the housing and a shoulder of guard 19, urging the guard against seal 17 of the spinning cylinder 11 and so the seals 17 and 18 at each end of the spinning cylinder are maintained closed under the force of the spring.

After dispensing the epoxy mixture, drive air at 22 is also fed to piston cylinder 23 at 24. The air to cylinder 23 forces drive piston 25 to drive plunger 20 through passages 2, 3, 6, and 8 and out nozzle orifice 9, cleaning out material therein. Then, the air drive to piston cylinder 23 is stopped, piston return spring 26 withdraws the piston and plunger to positions shown in FIGS. 1 to 5, where the piston abuts piston stop ring 27, ready for use again. Seals or plunger wipers 28 and 29 are provided on the piston side of the injection passages 31 and 32 in injection valve 1 to prevent the liquid materials from flowing out except through passages 2, 3, 6, 8, and 9.

Mixer/Dispensers With Annular Output Passages

Center Body Attached To Housing At Front of Nozzle: FIGS. 9 to 13 illustrate an embodiment of the present invention that includes all of the features of the first embodiment and in which the common passage is annular and defined by a center body attached to the housing at the front of the nozzle. A benefit of the annular passage is principaly that mixing is enhanced. For a given common passage cross section area, the greater outside diameter of the annular passage as compared with a cylindrical passage results in greater peripheral speed for the same rotational speed. The greater peripheral speed of the mixing section can result in more thorough mixing. Furthermore, the annular passage may be formed by a rotated cylindrical wall concentric with a stationery center body which results in considerable shear forces on the fluid material contained therein, inasmuch as the material adheres to the moving outer wall and to the stationery inner surface of the center body and so between these experiences considerable turbulence that enhances mixing.

In these Figures, the stationery valve 101 into which two different materials, a resin and a hardner flow, provides common annular passage 102 that feeds directly into annular mixing passage 103 coaxial and in registration therewith, that is part of the mixing assembly 104. The annular mixing passage 103 feeds directly into annular dispensing passage 106 which is part of the dispensing assembly 107 and is coaxial with and in registration with the mixing passage. From passage 106, the mixture of resin and hardner (the epoxy mix) flows to annular passage 108 of housing 140 and emerge from the dispensing orifice 109 at the end of passage 108.

The annular common passages are all formed by an outer cylindrical wall 102', 103', 106' and 108' and center body 99 concentric therewith. Center body 99 is stationery within these walls and attaches to the wall 102' at the output end of the common passage by, for example, connector spokes 98, 97 and 96 that define the output nozzle. Thus, the annular passages 102, 103, 106, 108 and orifice 109 all align and all are the same diameter so that the annular shaped clean out plunger 120 can pass through all of these passages and out of orifice 109 to clean out the passages. Plunger 120 shown in its withdrawn or retracted position in FIGS. 9 to 13, just enters passage 102 up to the side injection passages 131 and 132 that led into passage 102 from separate containers for the resin and hardner, respectively.

Injection passage 131 for the resin and 132 for the hardner may be directly opposite each other on opposite sides of annular passage 102 similar to the arrangement in the first embodiment shown in FIG. 4, or they may be staggered along passage 102 similar to the arrangement shown in FIG. 5. Other arrangements of the resin and hardner injection passages, as viewed along the longitudinal axis 110, may be similar to those for the first embodiment illustrated by FIGS. 6, 7 and 8. The resin and hardner injection passages may feed fluid into common annular passage 102 tangentially similar to that shown in FIG. 7 or similar to any of the arrangements shown in FIGS. 6, 7 and 8. The common feature of all these feeds is that the injection passage for each material into the common annular passage 102 is closed off by annular plunger 120 when it moves from its retracted position shown in FIG. 9, forward and into the passages 102, 103, 106 and 108.

In operation, with the annular plunger 120 in the retracted or withdrawn position shown in FIG. 9, the liquid resin and hardner are injected into passage 102 through the injection passages 131 and 132 and both flow immediately into passage 103 of mixer 104. Meanwhile, the mixing cylinder 111 that contains annular passage 103 is driven in rotation at high speed about axis 110 by drive train 112 from air motor 113. For this purpose, the mixing cylinder 111 is mounted on bearings 115 and 116 within the housing 140 of the dispenser and the mixer and injection housing 141. The ends of cylinder 111 include seals at 117 and 118 that prevent fluid material from leaking out of the passages. The spinning action imparted to annular passage 103 thoroughly mixes the liquid resin and hardner so that they emerge from passage 103 and flow into passage 106 of the lower seal guard 119 thoroughly mixed and this mix flows through the dispensing nozzle passage 108 and out orifice 109.

The lower seal guard 119 slideably fits within the front end of housing 140 and spring 121 acts between the housing and a shoulder of guard 119, urging the guard against seal 117 of the spinning cylinder 111 and so the seals 117 and 118 at each end of the spinning cylinder are maintained closed under the force of the spring.

After dispensing the epoxy mixture, drive air at 122 is also fed to drive piston cylinder 123 at 124. The air to cylinder 123 forces drive piston 125 to drive annular plunger 120 through passages 102, 103, 106, and 108 and out nozzle orifice 109, cleaning out material therein. Then, the air drive to piston 123 and motor 113 is stopped and piston return spring 126 withdraws the piston and plunger to positions shown in FIGS. 9 to 13, where the piston abuts piston stop ring 127, ready for use again. Seals or plunger wipers 128 and 129 are provided on the piston side of the injection passages 131 and 132 in injection valve 101 to prevent the liquid materials from flowing out except through passages 102, 103, 106, 108, and 109.

Center Body Attached To Housing In Back of Piston: FIGS. 14 to 18 illustrate an embodiment of the present invention that includes all of the features of the first and second embodiments and in which center body is attached to the housing in back of the plunger drive piston.

In these Figures, parts that are the same as and function the same as parts in the embodiment shown by FIGS. 9 to 13 bear the same reference number. All other parts have new reference numbers.

As shown in FIGS. 14 to 18, the stationery valve 101 into which two different materials, a resin and a hardner flow, provides common annular passage 102 that feeds directly into annular mixing passage 103 coaxial and in registration therewith, that is part of the mixing assembly 104. The annular mixing passage 103 feeds directly into annular dispensing passage 106 which is part of the dispensing assembly 107 and is coaxial with and in registration with the mixing passage. From passage 106, the mixture of resin and hardner (the epoxy mix) flows to annular passage 108 of housing 140 and emerge from the dispensing orifice 109 at the end of passage 108.

The annular common passages are all formed by an outer cylindrical wall 102', 103', 106' and 108' and center body 150 concentric therewith. Center body 150 is stationery within these walls and attaches to the wall 151 of the air chamber 152 at the high pressure side of the plunger drive piston 153. This attachment or anchor of the center body to the housing is by disc 154 that seals the chamber 153 and is secured to the housing by retaining ring 155.

Center body 150 passes slideably through annular plunger 160 and piston 153. An air seal against the drive air pressure is effected by resilient sealing ring 156 where center body 150 passes through piston 153.

Thus, the annular passages 102, 103, 106, 108 and orifice 109 all align and all are the same diameter so that the annular shaped clean out plunger 160 can pass through all of these passages and out of orifice 109 to clean out the passages. Plunger 160 shown in its withdrawn or retracted position in FIGS. 14 to 18, just enters passage 102 up to the side injection passages 131 and 132 that led into passage 102 from separate containers for the resin and hardner, respectively.

Injection passage 131 for the resin and 132 for the hardner may be directly opposite each other on opposite sides of annular passage 102 similar to the arrangement in the first embodiment shown in FIG. 4, or they may be staggered along passage 102 similar to the arrangement shown in FIG. 5. Other arrangements of the resin and hardner injection passages, as viewed along the longitudinal axis 110, may be similar to those for the first embodiment illustrated by FIGS. 6, 7 and 8. The resin and hardner injection passages may feed fluid into common annular passage 102 tangentially similar to that shown in FIG. 7 or similar to any of the arrangements shown in FIGS. 6, 7 and 8. The common feature of all these feeds is that the injection passage for each material into the common annular passage 102 is closed off by annular plunger 160 when it moves from its retracted position shown in FIG. 14, forward and into the passages 102, 103, 106 and 108.

In operation, with the annular plunger 160 in the retracted or withdrawn position shown in FIG. 14, the liquid resin and hardner are injected into passage 102 through the injection passages 131 and 132 and both flow immediately into passage 103 of mixer 104. Meanwhile, the mixing cylinder 111 that contains annular passage 103 is driven in rotation at high speed about axis 110 by drive train 112 from air motor 113. For this purpose, the mixing cylinder 111 is mounted on bearings 115 and 116 within the housing 140 of the dispenser and the mixer and injection housing 142. The ends of cylinder 111 include resilient ring seals at 117 and 118 that prevent fluid material from leaking out of the passages. The spinning action imparted to annular passage 103 thoroughly mixes the liquid resin and hardner so that they emerge from passage 103 and flow into passage 106 of the lower seal guard 119 thoroughly mixed and this mix flows through the dispensing nozzle passage 108 and out orifice 109.

The lower seal guard 119 slideably fits within the front end of housing 140 and spring 121 acts between the housing and a shoulder of guard 119, urging the guard against seal 117 of the spinning cylinder 111 and so the seals 117 and 118 at each end of the spinning cylinder are maintained closed under the force of the spring.

After dispensing the epoxy mixture, drive air at 122 is also fed to drive piston cylinder 152 via 157. The air to cylinder 152 forces drive piston 153 to drive annular plunger 160 through passages 102, 103, 106, and 108 and out nozzle orifice 109, cleaning out material therein. Then, the air drive to piston 153 and motor 113 is stopped and piston return spring 126 withdraws the piston and plunger to positions shown in FIGS. 14 to 18, where the piston abuts piston stop ring 127, ready for use again. Seals or plunger wipers 128 and 129 are provided on the piston side of the injection passages 131 and 132 in injection valve 101 to prevent the liquid materials from flowing out except through passages 102, 103, 106, 108, and 109.

The foregoing describes several embodiments of the present invention, The best known use of the invention is a dispenser incorporating a mixer for mixing two liquid materials as those materials are dispensed from an output nozzle and a clean out plunger for cleaning out all passages of the dispenser through which both materials flow. While the invention is described herein with reference to these particular embodiments, it will be apparent to those skilled in the art that variations and modifications can be made and that equivalents can be substituted without departing from the spirit of the invention as set forth in the claims.

What is claimed is:

1. A dispenser for mixing separated fluid materials and dispensing the mixture comprising,
  (a) sources of separate fluid materials,
  (b) a common passage having an input end and an output end and into which said separate liquid materials flow,
  (c) a separate passage for each of said fluid materials into said common passage at said input end thereof
  (c) said common passage being essentially straight and of constant cross-section dimensions,
  (d) a dispensing orifice at said output end of said common passage,
  (e) said common passage from said input end to said output end thereof is formed in more than one section including an injection section that defines said input end that is contained within a stationary injection body and into which said plunger projects at its withdrawn position as well as at its clean out position,
  (f) another of said sections of said common passage is rotatable on the longitudinal axis thereof and
  (g) means are provided for driving said other section in rotation with respect to said injection section when said fluid materials flow therethrough,
  (h) whereby said fluid materials are thouroughly mixed in said rotated section,
  (i) a plunger having a cleaning face at one end thereof,
  (j) said plunger cleaning face being located at said input end of said common passage at its initial withdrawn position and
  (k) means for driving said plunger face through said common passage from said input end to said ouput end thereof to a plunger face clean out position at said output end, forcing any material contained in said common passage out said orifice.

2. A dispenser as in claim 1 wherein,
  (a) means are provided for withdrawing said plunger face from said clean out position to said withdrawn position thereof where said plunger does not block said separate fluid injection passages into said common passage.

3. A dispenser as in claim 2 wherein,
  (a) said plunger face at said withdrawn position blocks said input end of said common passage preventing injected materials from flowing out of said common passage input end.

4. A dispenser as in claim 2 wherein said means for withdrawing is a spring that acts between said piston and said common passage and resists movement of said piston toward said plunger.

5. A dispenser as in claim 4 wherein,
  (a) said spring is a coil spring.

6. A dispenser as in claim 1 wherein,
  (a) said plunger, when at said withdrawn position, projects into said common passage at said one end and extends from said one end to said means for driving said plunger.

7. A dispenser as in claim 1 wherein,
  (a) means are provided for sealing said common passage against said plunger along said common passage before said separate fluid passages into said common passage at said input end thereof.

8. A dispenser as in claim 7 wherein,
(a) said sealing means includes at least one sealing ring contained in said common passage wall.

9. A dispenser as in claim 1 wherein said means for driving said plunger includes,
(a) a drive piston coaxial with said plunger attached thereto and,
(b) a source of drive fluid for driving said piston and
(c) means for driving said plunger from said output end to said input end of said common passage.

10. A dispenser as in claim 1 wherein,
(a) a center body is provided in said common passage.
(b) whereby said common passage is annular shaped in cross section and
(c) said plunger is annular shaped in cross section and fits slideably in said annular shaped common passage.

11. A dispenser as in claim 10 wherein,
(a) said common passage in defined by a cylindrical wall of constant diameter and said center body within and coaxial with said wall and of constant cross section diameter.

12. A dispenser as in claim 10 wherein,
(a) said center body attaches to said cylindrical wall at said output end of said common passage.

13. A dispenser as in claim 10 wherein,
(a) said center body passes through said plunger and emerges from the driven end thereof and
(b) said emerging end of said center body is secured so as to prevent longitudinal movement thereof with respect to said passages.

* * * * *